United States Patent [19]

Chmelir et al.

[11] Patent Number: 4,857,610
[45] Date of Patent: Aug. 15, 1989

[54] PROCESS FOR THE CONTINUOUS PRODUCTION OF POLYMERS AND COPOLYMERS OF WATER-SOLUBLE MONOMERS

[75] Inventors: Miroslav Chmelir, Krefeld; Josef Pauen, Willich, both of Fed. Rep. of Germany

[73] Assignee: Chemische Fabrik Stockhausen GmbH, Krefeld, Fed. Rep. of Germany

[21] Appl. No.: 942,330

[22] Filed: Dec. 16, 1986

[30] Foreign Application Priority Data

Dec. 18, 1985 [DE] Fed. Rep. of Germany ....... 3544770

[51] Int. Cl.$^4$ .......................... B01J 19/22; C08F 2/10; C08F 20/06
[52] U.S. Cl. ...................................... 526/88; 526/240; 526/265; 526/303.1; 526/306; 526/307; 526/307.3; 526/307.6; 526/317.1; 526/318.3; 526/318.5; 526/328; 526/328.5; 526/329.3; 526/341; 526/342; 427/54.1; 427/340; 427/342; 427/385.5; 427/389.9; 427/391; 427/392; 427/393.5; 522/3; 522/33; 522/178; 522/182
[58] Field of Search ...................... 526/88, 317.1, 240, 526/303.1, 306, 307, 307.3, 307.6, 317.1, 318.3, 318.5, 341, 342, 265, 330, 328, 328.5, 329.3; 522/182, 184, 186, 3, 40, 33, 37, 43, 178; 427/54.1, 346, 385.5, 389.9, 391, 392, 393.5, 340, 342

[56] References Cited

U.S. PATENT DOCUMENTS

| 2,750,320 | 6/1956 | Latham | 522/182 X |
| 3,732,193 | 5/1973 | Suarz | 526/88 X |
| 3,929,751 | 12/1975 | Gershberg | 526/234 |
| 4,138,539 | 2/1979 | Landolt et al. | 526/93 |
| 4,178,221 | 12/1979 | Boutin et al. | 526/88 X |
| 4,283,517 | 8/1981 | Perricone et al. | 526/88 X |
| 4,647,598 | 3/1987 | Yada et al. | 522/182 X |

FOREIGN PATENT DOCUMENTS

| 752639 | 1/1942 | Fed. Rep. of Germany | 526/88 |
| 1915903 | 3/1969 | Fed. Rep. of Germany | 526/88 |
| 1262101 | 2/1969 | United Kingdom | 526/88 |

OTHER PUBLICATIONS

European Search Report citing German references.

Primary Examiner—Joseph L. Schofer
Assistant Examiner—F. M. Teskin
Attorney, Agent, or Firm—Sprung Horn Kramer & Woods

[57] ABSTRACT

The present invention relates to a process and an apparatus for the continuous production of polymers and copolymers of water-soluble monomers particularly arcylic acid and/or methacrylic acid, optionally with additional comonomers, by the polymerization of an aqueous monomer solution that is introduced into the trough that is formed by an endless conveyor belt. The trough-like shape of the conveyor belt changes continuously into an extended flat profile during the polymerization process; starting from the side edges and working towards the center of the trough formed by the conveyor belt, the resulting polymer gel strand is released continuously during the transition of the curved trough-like shape of the conveyor belt into the extended, flat form.

19 Claims, 6 Drawing Sheets

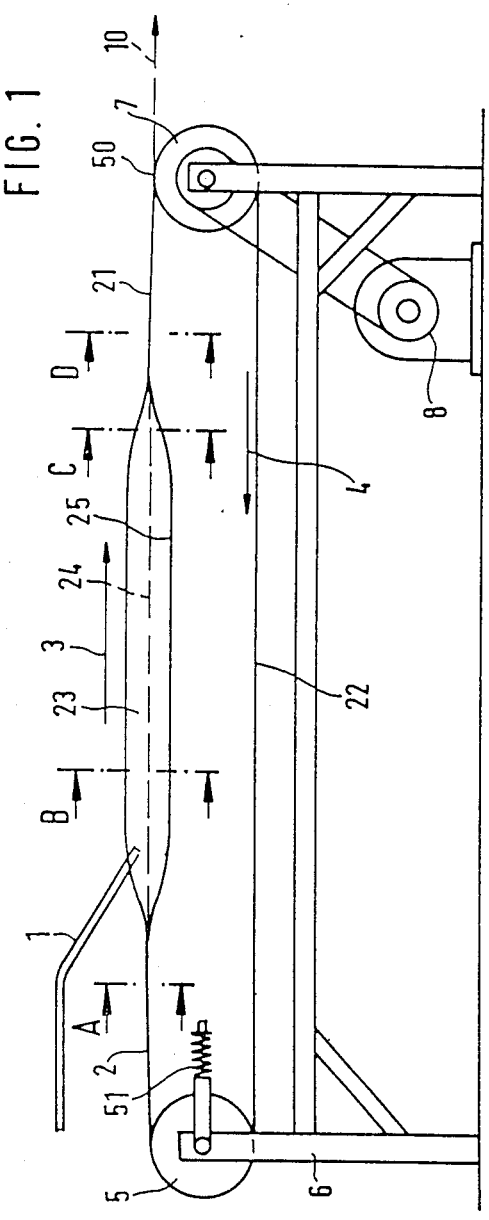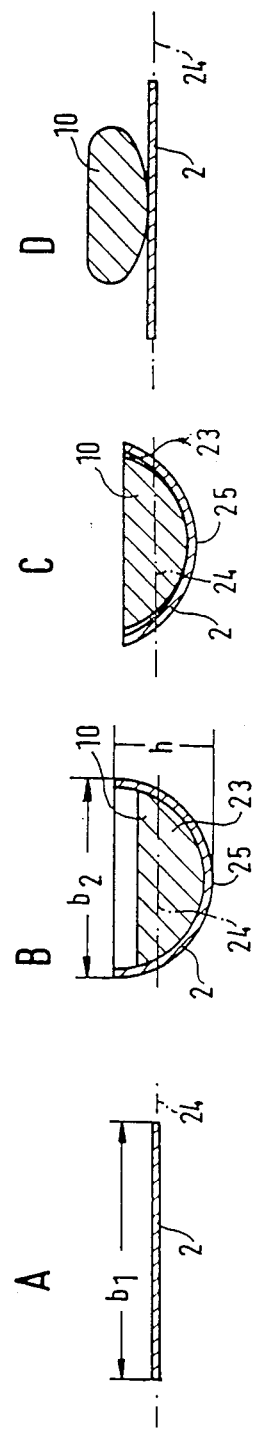

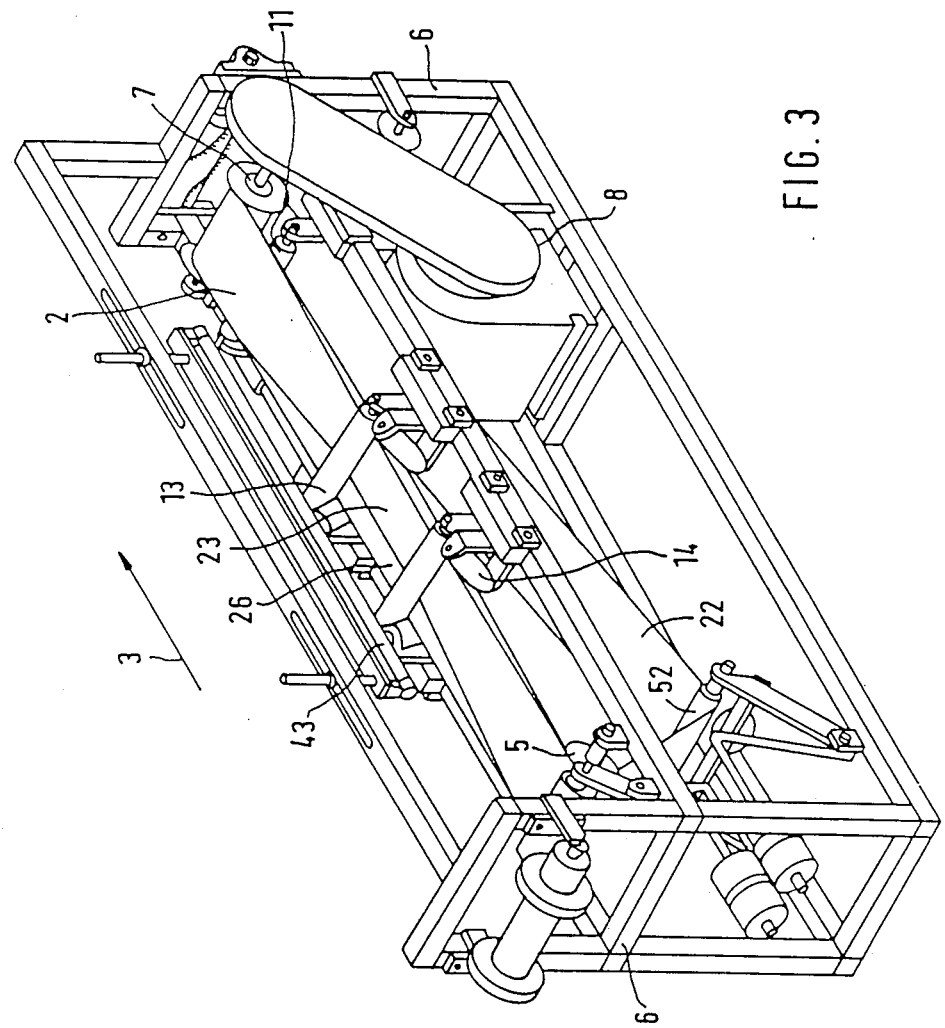

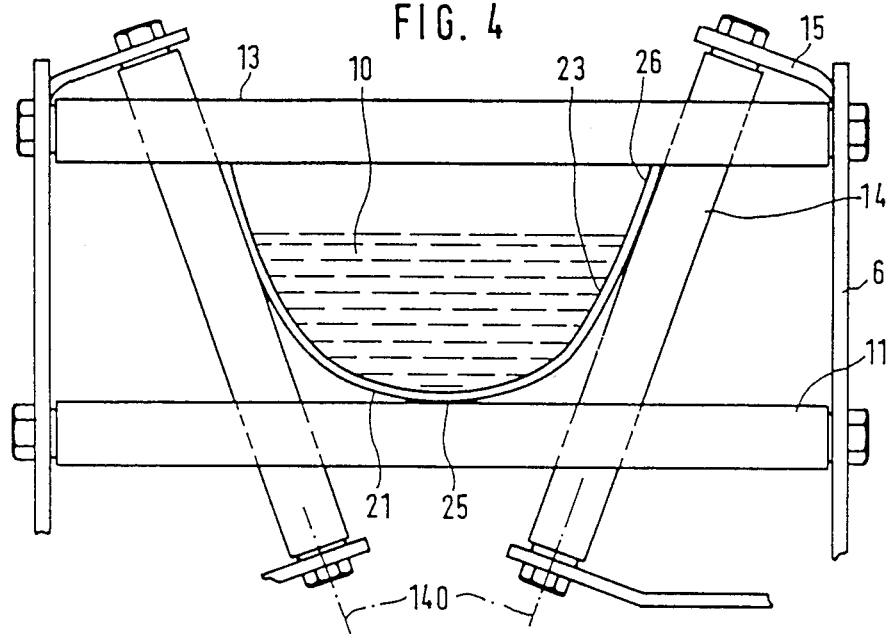
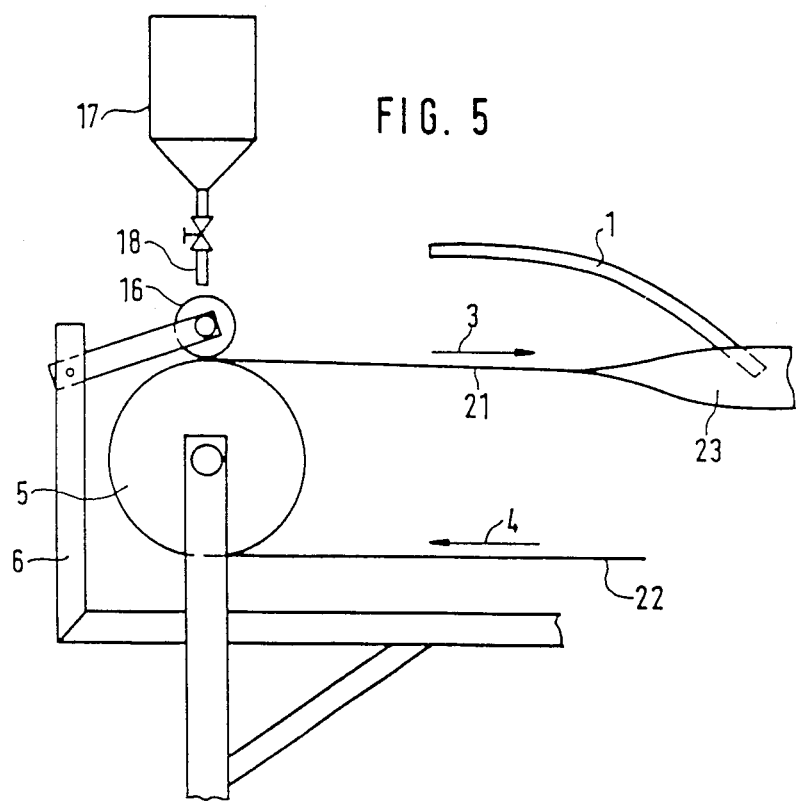

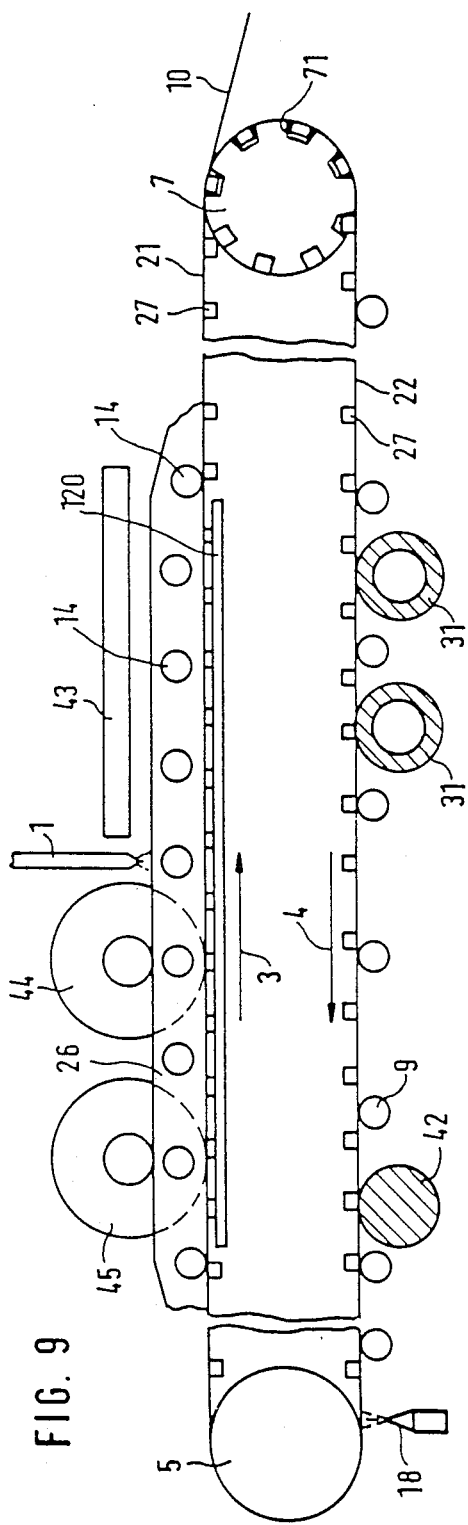
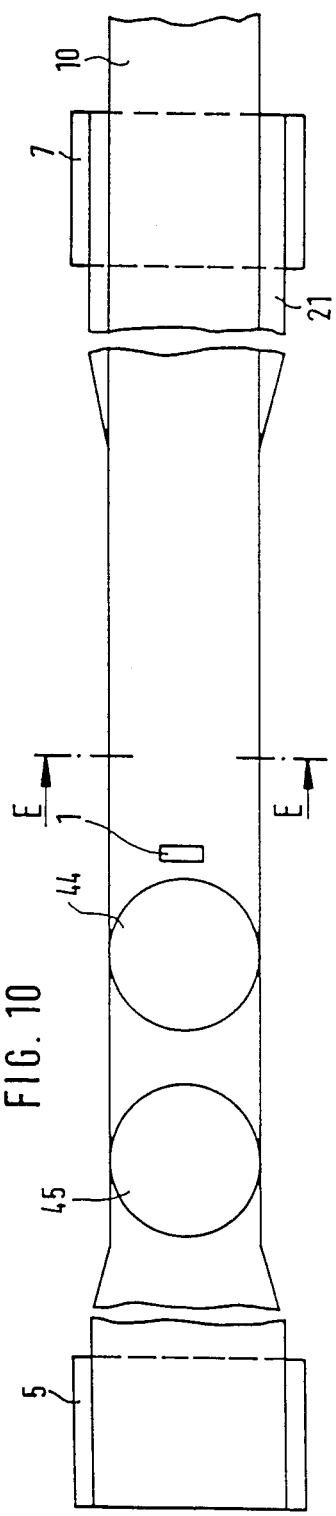
FIG. 9
FIG. 10

PROCESS FOR THE CONTINUOUS PRODUCTION OF POLYMERS AND COPOLYMERS OF WATER-SOLUBLE MONOMERS

The present invention relates to a process and apparatus for the continuous production of polymers and copolymers of water-soluble monomers.

It has long been known that water-soluble monomers, such as acrylic monomers, can be polymerized in dilute aqueous solutions so as to obtain the polymers in the form of gels which may then be dried and comminuted. When this is done, the polymerization is carried out in a continuous process on a conveyor belt to which a thick layer of reactants is applied or in a container that is attached to a moving conveyor belt, in which case the process is carried out discontinuously and batch-wise.

The polymerization of acrylic acid in solution usually takes place in a temperature range from 20°–100° C. the chemical reactivity of acrylic aid, primarily at higher temperatures, leads to the fact that practically all the material is attacked sooner or later by the acrylic acid and the polymer gel adheres firmly to this material. This adhesion of the polymer gel is even stronger if the polymerization takes place quickly and there is thus little time for cooling and the removal of the heat of the reaction and a reduction in volume of the polymer gel.

A number of processes for the production of polymers and copolymers of water-soluble monomers such as acrylic acid or methacrylic acid are known, although, in every instance, these are unsatisfactory from one point of view or another.

In the process and apparatus described in DE-OS No. 20 59 241, mold boxes of various shapes and heights, with capacities varying from 2–200 liters, are transported on a linked belt conveyor and filled with the monomer solution and the catalytic solutions from a dispensing apparatus, through a mixing apparatus, with the help of metering pumps. This means that a monomer solution can also be polymerized even at increased layer thicknesses, although the advantages of producing an endless strand of polymer gel cannot be realized by this method. The mold boxes can be of thermoplastic material or of other material—for example, metal—that is coated or provided with a layer of thermoplastic material. In this regard, the weight of the polymer gel must be such that the contact area A between the gel mass and the inside wall of the mold box, the adhesive force F and the gel weight W satisfy the relationship: $W > A.F.$ (see DE-AS No. 24 21 006).

Even when this condition is satisfied, small amounts of polymer gel remain in the mold box, due to the high viscosity and tackiness of the polymer gel, and these have to be removed. In this process, cleaning the individual mold boxes is both difficult and time consuming since it is impossible to provide for continuous cleaning by means of rotating brushes. In order to simplify the removal of the polymer gel from the mold boxes, various shapes of polymerization vessels have been experimented with; a preferred shape is described in DE-OS No. 28 24 313, this being in the form of a truncated cone, a hemisphere, or a truncated pyramid.

In addition to linked belt converyors with containers, endless belt systems with endlessly moving flat conveyor belts are known for carrying out the polymerization process. A redox-system polymerization of water soluble polymers on an endless conveyor belt is described, for example, in U.S. Pat. Ser. No. 4,138,539. In this process, the monomer solution is mixed with azoisobutyronitrile and ammonium iron sulphate and sprayed onto the belt at a metered rate of 2 kg per minute. At a belt speed of 1 foot/88 seconds, the total polymerization time amounts to 65 minutes.

Polymerization can also be initiated by high-energy radiation with mercury vapour or xenon lamps as well as by fluorescent lights, as is described in DE-OS Nos. 20 50 988 or DE-OS 20 09 748. In this process, the monomer solution with the dissolved photoinitiator usually flows through an applicator system onto an endless steel belt or onto a conveyor belt with a carrier of water repellent material of, for example, fluoropolyolefin polymer or copolymer or metal coated plastic foil, which makes it possible to scrape off the dried polymer.

In the production of an emulsion of a water soluble polymer by means of ultraviolet light on a moving conveyor belt, coating thicknesses of 10–50 mm are used, whereby a viscous polymer emulsion results as the end product, as is described, for example, in DE-OS No. 32 08 369.

For the production of polymers of, for example, (meth)acrylic acid, on an endless conveyor belt, the known conveyor belt designs that are used, having guide pulleys and optional tensioning systems, are essentially flat and have no pre-formed trough which would permit a large coating thickness of the applied polymer solution. Nor does the conveyor belt assume a trough-like shape, because of the relatively low weight of the liquid reaction components, which are applied in only a thin layer. For this reason, the throughput and space-time yield for the polymers that are produced are relatively low in the case of such known continuous processes. In actual fact, in most cases, coating thicknesses of only 0.5 to a maximum of 2 cm. have been reported—see DE-OS Nos. 2545 290, DE-OS 27 16 606, DE-AS 10 32 922, U.S. Pat. Ser. No. 3,929,751, DE-AS Nos. 22 48 715, DE-OS 20 50 988, and DE-OS 35 06 534.

Only DE-OS No. 3246 905 reports a possible coating thickness of 1–10 cm for a polymerization time of 1–24 hours and a subsequent storage time of the polymer gel of 10–50 hours for the production of methacrylamide polymers on a thermally controlled base (for cooling) having a release sheet on an endless belt system. However, no construction features of the belt system which would permit such a thick layer of liquid reaction components are described at all. In the case of such a thick layer of reactant solution, it is necessary to have a sealing capability in all directions so as to prevent the solution from running off or flowing back. As far as can be ascertained from the examples, a reaction time of 2 hours for a 2 cm layer and obviously correspondingly longer times (of up to 24 hours) for greater coating thicknesses indicate that the space-time yield for these polymerization processes is very low.

In order to counteract the tackiness of the resulting polymer gels on the wall of the polymerization vessels, as in the case of the linked belt conveyors described above, attempts have been made to work with the addition of a thermally decomposed free-radical initiator (see DE-OS 22 48 715) or by the addition of higher aliphatic acids and their salts, lauric, myristic, palmitic, stearic, arachidic or behenic acid according to DE-OS 28 24 313 or DE-AS No. 27 47 168.

The present invention has for its object to improve upon the continuous process for the production of polymers or copolymers of water-soluble monomers by polymerization on endless conveyor belts - especially with regard to the space-time yield of the process, reduction of the degree of agglutination of the polymer gel on the conveyor belt, and process economy.

The present invention meets this object by providing a process for the continuous production of polymers and copolymers of water-soluble monomers using an endlessly moving conveyor belt in such a manner that the liquid reaction components are introduced in the form of a layer at least one centimeter thick into a trough that is formed continuously in the conveyor belt. During the polymerization of the reaction components, the trough-like shape of the conveyor belt changes continuously into an extended flat form and the resulting polymer gel strand is continuously released from the side edges towards the centre of the trough formed in the conveyor belt, as the profile of the curved trough-like shape of the conveyor belt flattens out. In the present invention, the adhesion of the polymer gel is significantly reduced or even eliminated when an endless conveyor belt is used and the invention permits continuous polymerization of the acrylic acid or the methacrylic acid in a relatively thicker layer and in a shorter period of time. At the same time, a large space-time yield at a conversion rate of more than 98%, preferably more than 99%, can be achieved. The adhesion of the polymer gel that is formed is prevented or greatly reduced by the alteration of the trough-like shape of the conveyor belt in the course of the polymerization process, as is proposed by the present invention. At the same time, the release of the formed polymer gel from the surface of the conveyor belt, which proceeds gradually from the side edges towards the centre, can take place even during the polymerization process, as the shape of the conveyor belt continuously reverts to a flat profile.

The process according to the present invention firstly relates to the polymerization of acrylic acid and methacrylic acid alone as a homopolymer or as a copolymer, as well as to the polymerization of other water-soluble monomers apart from acrylic acid and methacrylic acid, such as acrylamide, methacrylonitrile and acrylonitrile, vinyl pyridine, and vinyl acetate; other water-soluble monomers such as polymerizable acids and their salts - in particular, maleic, fumaric, itaconic, vinylsulfonic or acrylamidopropane sulfonic acids—and the esters of polymerizable acids containing hydroxy groups—in particular, the hydroxyethyl and hydroxypropyl esters of acrylic and methacrylic acids. In addition, esters and amides of polymerizable acids containing amino groups and ammonium groups, such as dialkylaminoesters—in particular the dimethyl and diethylaminoalkylesters of acrylic and methacrylic acids—as well as the trimethyl—and triethylammoniumalkyl esters and the corresponding amides may be used. In additional, cross-linking monomers such as, for example, monomers with more than one polymerizable group in the molecule can be polymerized in small amounts.

The foregoing monomers can polymerize along to form homopolymers or together to form copolymers. Acrylic acid and/or methacrylic acid are preferred as the water-soluble monomers for production of the copolymers.

Monomers that are insoluble in water can be copolymerized in small quantities - such as the esters of acrylic and/or methacrylic acid with $C_1$-$C_{10}$ alcohols, styrene, and alkylated styrenes. In general, the proportion of water soluble monomers is 40–100%-wt, relative to the totality of the monomers. The proportion of cross-linking comonomers is 0–20%-wt, preferably 0.01–2.0%-wt, relative to the totality of the monomers. As a rule, the water insoluble (hydrophobic) monomers account for 0–40%-wt of the monomers.

The cross-linking monomers are bi- or multifunctional monomers, e.g., amides such as methylene bisacrylamide or methacrylamide or ethylene bisacrylamide; esters of polyols, e.g. diacrylates or triacrylates such as butanediol diacrylate, ethylene glycol diacrylate, ethylene glycol methacrylate, trimethylol propane triacrylate, and vinyl methacrylate; and allyl compounds such as allyl(meth)acrylate, triallylcyanurate, maleic acid diallyl ester, polyallyl ester, tetrallyloxyethane, triallylamine, tetraallyl ethylene diamine; allyl esters of phosphoric acid or phosphorous acid; and cross-linkable monomers such as the N-methylol compounds of amides such as the methacrylic amides or acrylamides and the ethers derived therefrom.

Polymerization can be initiated by means of chemical catalysis and/or high energy light or radiation. Examples of suitable catalysts are per-compounds such as potassium persulfate and hydrogen peroxide; organic peroxides such as benzoyl peroxide and tertiary butyl perpivalate; redox systems such as potassium persulfate/sodium disulfite and hydrogen peroxide/hydroxyamine chloride; and azoinitiators, such as AIBN (2,2'-azobis-(isobutyronitrile)) or ABAH (2,2'-azobis(2-amidinopropane) dihydrochloride). As photo-initiators, there may be used benzoin and its derivatives, e.g., benzoin ethers such as benzoin-ethyl-propyl-ether and benzil and its derivatives such as benzil ketals or acryldiazonium salts, acetophenone derivatives and many others, either alone or as mixtures and/or in admixture with catalyst systems that contain per-compounds or azoinitiators. In general, the photo-initiator content is 0.002–2.0%-wt, preferably 0.01–0.2%-wt, relative to the monomers employed. The catalyst content is generally 0.02–5.0%-wt, preferably between 0.20 and 2.0%-wt, relative to the monomers.

The process of the invention is carried out in an aqueous solution containing the water-soluble monomers (and, if applicable, the comonomers) in a concentration of 2.2 to 8.3 moles of polymerizable double bonds per kilo of monomer solution, especially 2.6 to 6.25 moles (corresponding to 16–60%-wt, and especially 25–45%-wt acrylic acid to monomers) and at a temperature in the range from about −10 to 120° C.

Polymerization of the solution on the endless conveyor belt can take place within 10–60 minutes, preferably within 10–30 minutes, by which means a very high space-time yield is achieved.

As an example, with a band 1.2 m wide and 20 m long, and at a coating thickness of 10 cm, it is possible to produce a polymer gel strand of 55–68 kg/min (3300 to 4080 kg/h) at a conveyor belt speed of 65–80 cm/min and with reaction times from 25–30 minutes.

In a preferred method of carrying out the process, the pH value of the monomer solution is selected to be below 10, preferably between 2 and 7, and more preferably between 3.5 and 5.

It is preferred that the monomer solution be fed continuously into the trough formed by the conveyor belt, with the catalyst and/or photo-intiator solutions being combined with the monomer solution shortly before it emerges or else added separately to the trough in the conveyor belt and the components mixed together. It is preferred that the monomer solution be applied to the trough in such a quantity that a coating thickness of at least 2 cm, preferably more than 6 cm, is formed and such that the polymer gel strand assumes the shape of the trough during the polymerization process. The coating thickness of the monomer solution that is applied is limited by the dimensions of the conveyor belt or the trough that is formed, and is also dependent on the type of polymerization.

The viscosity of the reactant solution, i.e. of the monomer solution, can be influenced by the addition of natural or synthetic thickening agents, such as alginates, carboxymethylcellulose, polyvinyl alcohol, high molecular polymers based on acrylic acid derivatives—such as mono- and copolymers of acrylamide, acrylic acid and acrylonitrile—or ethylene oxide. It is preferred that a monomer solution with viscosities (measured with a Brookfield Viscosimeter at 20 rpm) in the range of 5-5000 mPa.s, in particular 10-200 mPa.s, be used. By using the thickening agent additive, the viscosity of the liquid reaction components can be so matched to the speed of movement of the conveyor belt that only a limited return flow of the reaction components, or no return flow at all, to the conveyor belt can occur at a desired coating thickness of the applied monomer solution.

Continual modification of the trough-like form of the conveyor belt is of very great importance for releasing the polymer gel strand that is being formed from the conveyor belt. Furthermore, it is extremely important to minimize the adhesion of the polymer gel strand to the conveyor belt. The continuously moving conveyor belt should, at least in some areas, be flexibly formed so as to match the desired trough-like profile during the polymerization phase. The conveyor belt can be made of various materials, although these must meet the requirements of good tensile strength and flexibility, good fatigue strength under repeated bending stresses, good deformability and chemical resistance to the individual reaction components under the conditions of polymerization. These demands are only seldom met by a single material, particularly with regard to chemical resistance, and it is therefore preferred that a multi-layer material be used for the conveyor belt. The mechanical requirements can be satisfied by, for example, a metal (e.g. steel) belt or a rubber belt with fabric inserts of natural and/or synthetic fibres or glass fibres, or by steel cords, with the chemical resistance being achieved by outer layers of materials such as polyeolefins, e.g., polyethylene, polypropylene, polyisobutylene; halogenated polyolefins such as polyvinyl chloride, tri- or tetrafluorethylene; polyamide; natural or synthetic rubber; polyester resin or epoxy resin.

For the process according to the present invention, it has been found that most plastics are not completely resistant to the aqueous monomer solutions—particularly of acrylic acid and/or methacrylic acid—which are so aggressive under the conditions of this reaction, to the point that they cannot prevent the adhesion of the polymer gel strand to the conveyor belt, particularly if polymerization is carried out at a pH value of less than 7. These materials are suitable as the outer chemically resistant layer of the conveyor belt if they are in the form of a layer for separation from the conveyor belt, as a release sheet for one-time use. In this connection, in the present invention, a cellulose or plastic based release sheet is provided on the conveyor belt and forms a base for and becomes part of the polymer gel strand that is produced. According to the present invention, it has been found that for the conveyor belt surface that comes into contact with the reaction components, only silicon rubber is sufficiently chemically resistant and useable for long-term operation, since the adhesion of the polymer gel strand is maintained within such limits that do not prevent separation of the strand. This offers advantages primarily if the pH value of the monomer solution is lower than 10 and in particular if the pH value is in the range between 2 and 7.

The release of the polymer gel strand from the outer layer of the conveyor belt is greatly influenced and simplified by the continuous change in the shape of the trough formed in the belt. According to the present invention, in order to form this trough-like shape, the side edges of the conveyor belt in its longitudinal direction are curved upwards from the horizontal plane before forwardly of the region in which the reaction components are introduced. The monomer solution is then metered into the relatively deep trough and the resulting polymer gel assumes this shape during the polymerization process. With regard to the formation of the trough, a further embodiment of the invention provides for the level of the conveyor belt in the area in which the trough is formed—especially in the area in which the reaction components are added—to be lowered relative to the previous level of the approaching flat conveyor belt. This makes it possible to prevent the monomer solution escaping or running back. A further means of preventing the monomer solution running back on the conveyor belt comprises sealing off the trough of the conveyor belt ahead of the area in which the monomer solution is added. This also ensures a thicker coating of the reaction components. During polymerization, the polymer gel consolidates and as the conveyor belt continues to move forward, the trough profile is once again continuously changed towards a flat form so that initially the release of the polymer gel strand along the edges can take place in a progressive manner. Only at the end of the polymerization process is the polymer gel strand released in the base area, i.e., in the central area of the conveyor belt.

The present invention uses an analogous relationship to that already described in DE-OS No. 20 59 241 for the release of the polymer gel strand from the surface of the conveyor belt or from a release sheet that is used with the conveyor belt, but with the difference that instead of the gel weight W to overcome the adhesion, the force P with which the flexible conveyor belt is converted back from the curved trough-like shape to the flat and extended state must be used. This force P, as might be expected, is much smaller than the weight W of the polymer gel in a mold box asdescribed in DE-OS No. 20 59 241, such box being of a width comparable to the width of the endless conveyor belt. Nevertheless, the relationship P>A.F. that is required for releasing the polymer gel strand is fulfilled according to the present invention, since at a given constant adhesive force F, the contact surface A is kept to a minimum by the gradual and continuous profile change of the conveyor belt.

The resulting polymer gel strand is removed from the conveyor belt as a continuous strand that is of a soft semi-solid consistency and is then passed on for further processing such as drying or the like.

In order to carry out the process according to the present invention, a belt system is used which comprises an endless moving conveyor belt passing over supporting elements and at least two guide rollers, of which at least one is driven and one is configured so as to be adjustable. Optionally, a winding and feed system for a release sheet that may be used in sections on the upper surface of the conveyor belt is provided. The system includes a supply and metering system for the reaction components, and optional irradiating means arranged in the direction of movement of the conveyor belt after the supply and metering system, together with cooling and heating devices, and a removal system for the polymer gel strand that is arranged in the vicinity of the guide roller for the return run of the conveyor belt. In order to provide for the completion of polymerization with the highest possible space-time yield, according to the present invention, in the vicinity of the upper run of the conveyor belt on both sides of the horizontal supporting elements, starting in the area of the supply and metering systems, there are upwardly extending supporting elements, the longitudinal axes of which intersect at a point that is beneath the upper run, and which shape the conveyor belt that is supported by them so that it become suitably trough-shaped. Thus, according to the present invention, the conveyor belt is supported in the vicinity of the supply system for the reaction components by a plurality of trough-shaped supporting and bearing elements that form a deep trough-like or dish-like configuration for the reaction components that are introduced. The desired trough-like shape is determined by the shape and arrangement of the supporting elements along the length of the path of the upper run. In the area where the reaction components are introduced, the supporting elements should be relatively close to each other, whereas in the subsequent area, after the polymerization has been initiated, the supporting elements can be arranged somewhat further apart. Both the angle of inclination of the supporting elements and the cross-section of the supporting elements can be varied in order to flatten out the initially deep trough towards the end of the polymerization section and once again bring it to an extended state. In a further embodiment of the invention, each supporting element is preferably formed by a cylindrical or spherical roller that is rotatable about its longitudinal axis. By varying both the cross-section of the roller as well as the configuration of the roller it is easy to achieve the desired cross-sectional shape of the trough. In order to ensure proper formation of the trough by the conveyor belt, both when it makes the transition from a flat to a trough-like shape and when it is once again returned to the flat shape, a conveyor belt that is flexible in both the longitudinal and the transverse directions is preferred.

Since, in the process and the apparatus according to the present invention, the reaction components are to be introduced into a deep trough to form a thick layer, the liquid reaction components must be prevented from flowing back. There are several possibilities for doing this. According to one embodiment of the invention it is proposed that in the vicinity of the supporting elements, the bearing elements and thus the horizontal plane of the upper run be arranged so as to be lower than the horizontal discharge level of the guide roller. Because of the corresponding arrangement of the bearing elements and the inherent weight of the conveyor belt, the trough that is formed is lower in the area in which the liquid reaction components are introduced—i.e., it is deeper than the level of the conveyor belt forwardly of the introduction area—so that any backflow of the liquid reaction components is prevented. In the event that a release sheet is also used with the conveyor belt, the dispensing system for the release sheet is located higher so that the trough is downwardly inclined in the direction of motion so that any backflow of the reaction components is prevented.

The invention further contemplates that in the vicinity of the supporting elements, parallel to the plane of the bearing elements and at the ends of the upright side edges of the upper run of the conveyor belt, there is at least one limiting roller. In conjunction with the lowering of the base level of the conveyor belt, this means that simultaneoulsy the upwardly curved edges of the conveyor belt can be pressed downwards by the upper limiting rollers to lower the trough that is formed. By this means, it is possible to measure out the liquid reaction media into the trough without any additional seals to the front or to the rear and at the same time prevent the liquid reaction components from either flowing back or running off the belt.

According to a further feature of the present invention, it is also possible to prevent the reaction components from flowing back by providing before the supply and metering system (viewed in the direction of movement) at least one pressure roller arranged parallel to the bearing elements, this being of a shape that corresponds to the trough-like shape of the upper run of the belt. By arranging one or a plurality of pressure rollers adjacent the upper surface of the run, which conform to the trough-like shape of the run and thereby seal off the trough in the direction opposite to the direction of motion, it is also possible to select the position of the conveyor belt base level regardless of the position of the guide roller. In other words, the base level can be at the same height as, lower than, or even higher than the guide rollers. It is preferred that these pressure rollers be of a chemically resistant material, in particular of such a material that is also elastic such as, for example, plastic, natural or synthetic rubber or silicon rubber that has been vulcanized to varying degrees. These elastic pressure rollers can be used either alone or in combination with pressure rollers made from hard materials such as stainless steel, for example.

In order to provide for the movement, support and maintenance of the conveyor belt and the trough-like shape, horizontal bearing elements such as, for example, support rollers, are provided in the first phase of polymerization. However, according to a further feature of the present invention, it is also possible to provide a guide rail in the area of the upper run of the belt as a horizontal supporting element, said rail extending in the direction of movement and having a continuous opening, and also to provide the conveyor belt with a rib or support with a hammer-head profile, which travels along the opening in the guide rail. On the one hand, this provides a positive guidance for the conveyor belt in the guide rail and in addition the hammer-head profile rib can also be used to drive the conveyor belt by engagement with a suitably grooved driven guide roller.

The trough-like shape of the upper run of the belt can be relatively flat if the belt is of a suitable width or it can be deep if a narrow belt is used. Belt widths of 2–200 cm when extended are preferred since these can be formed into a trough 15–150 cm wide when the trough is 7–30 cm high.

When it leaves the conveyor belt, the polymer gel strand that is formed in the trough of the conveyor belt by polymerization is of a relatively soft consistency. Its own weight alone can cause this polymer gel strand to tear at a very soft spot or at a spot which is insufficiently polymerized and is relatively liquid. In order to prevent this, at least one spiked or toothed roller and/or a pair of pressure rollers are arranged after the point at which the polymer gel strand is removed from the conveyor belt. This toothed roller or the pressure rollers should be of a material which is chemically resistant to the reaction components and should run synchronously with the guide roller in order to assure even and smooth removal of the strand.

The apparatus according to the present invention is also suitable for the completion of other chemical or physical processes in which solid, semi-solid, or gel-like to highly viscous end-products are produced from liquid starting components. Pure liquids, emulsions, suspensions or solutions of solids in various solvents can be used as the starting components.

The process and apparatus according to the present invention will now be described in greater detail, by way of example only and with reference to the accompanying drawings, wherein:

FIG. 1 is a schematic side view of a continuous belt conveyor used in the process of the invention;

FIG. 2 is a schematic cross-sectional representation of the upper run of the conveyor belt show in FIG. 1;

FIG. 3 is a perspective view of apparatus according to the invention;

FIG. 4 is a schematic view along cross-section B of FIG. 1, showing bearing and supporting elements;

FIG. 5 is a schematic partial view of a belt system used in the process of the invention, having a device for supplying release agent;

FIG. 9 shows the arrangement of the belt system with pressure rollers used to form the trough;

FIG. 10 is a further view of the belt system of FIG. 9; and

Figure 6:
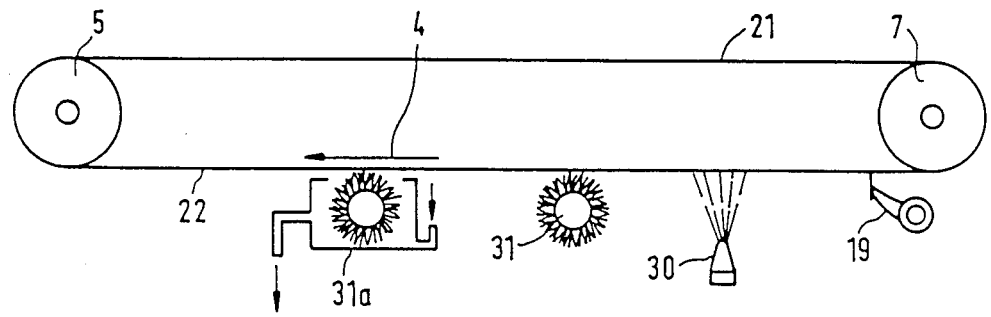
FIGS. 6 and 7 are two schematic views of a belt system used in the process of the invention, having various cleaning systems.

According to FIG. 1, the functional elements of a belt system used for the continuous polymerization in a thick layer of monomer solution comprises an endless conveyor belt 2, passing over at least two guide rollers 5, 7. It is preferred that the guide roller 7 that is arranged at the removal point 50 for the polymer gel strand 10 be configured as a drive roller driven by a drive means 8. The position of the other guide roller 5 can be adjusted by means of springs 51 and weights or screws so as to apply the necessary tension to the conveyor belt. Thus the conveyor belt 2 is simultaneously a supporting and a conveying medium for the reaction components that are introduced by means of the supply and metering system 1. The endless conveyor belt and the guide rollers are arranged on a base frame 6. The conveyor belt 2 runs in the direction indicated by the arrows 3, 4, in which connection the upper run 21 of the belt is deformed by means of supporting elements (not shown here in greater detail) to form the trough-like shape 23. The trough 23 can be so formed that its base passes through the peak plane 24 of the guide rollers 5, 7 or instead is lowered relative thereto, so that the base of the trough runs along the level 25, for example. The trough-like deformation of the upper run 21 from the flat and extended state of conveyor belt 2 begins shortly before the supply and metering system for the reaction components 1, which can be added either individually or in admixture. At the end of the polymerization section, the trough 23 of the conveyor belt once more reverts to the flat, extended state. As hereinafter described, the lower run of the belt 22 that passes back over the guide roller 7 can then be cleaned of adhering polymer residue in this area, then returned to the application and polymerization section.

FIG. 2 is a schematic drawing of the belt cross-sections A, B, C, and D along the upper run of the belt and the polymerization section. As can be seen in cross-section A, the conveyor belt 2 that comes from the guide roller 5 is still even and flat and is located in the peak plane 24 where it is of width $b_1$, in particular 20–200 cm. In the area of cross-section B, the conveyor belt has been formed into the deep tub-like trough 23 which is of height h and width $b_2$ and accommodates the reaction components that polymerize to form the polymer gel strand 10 assuming the shape of the trough. The base level 25 of the trough or the conveyor belt can be lowered relative to the plane 24 and this simple expedient is used to prevent the reaction components flowing or leaking backwards from the trough. At the end of the polymerization section, as can be seen in cross-section C, the conveyor belt 2 reverts further towards a flat profile and the polymer gel strand 10 which is forming and consolidating is continuously released from the side edges of the belt. As this happens, it is also possible for the belt base level 25 to be raised in the direction of peak plane 24. In cross-section D, the belt 2 has become even more flattened and the polymer gel strand 10, which because of its somewhat soft consistency has assumed a more elliptical form, only remains in contact with the conveyor belt in the area of the base and can easily be removed from the belt 2 at the discharge point 60 from the guide roller 7.

FIG. 3 shows the basic construction of a belt system similar to that of FIG. 1. The continuous deformation of the conveyor belt 2 in the area of the upper run of the belt to form the trough 23 and then change back to the flat, extended state can be seen in this drawing. The conveyor belt, which passes over the guide rollers 5, 7, is supported in the area of the upper run by horizontal support roller 11 and is tensioned in the area of the lower run 22 by horizontal roller 52. The formation of the trough is effected by side support rollers 14, which impart the trough shape to the belt. The conveyor belt 2 which passes over the support rollers 11 and the side support rollers 14 is raised along the edges 26 and thus forms the trough 23. In order to prevent the return flow of the liquid reaction components from the trough, the base of the trough in the supply zone can be lowered, which can be achieved both by the inherent weight of the belt itself with the reaction components and also by means of additional system elements. Thus, in the area in which the reaction components are added, the conveyor belt is in a lower position than in the preceding area and this can be achieved by the guide roller or the dispensing system for applying the release sheet to the upper surface of the conveyor belt being located at a higher level.

FIG. 4 is a cross-section of a possible construction for the continuous forming of the upper run 21 of the conveyor belt into a trough 23 as in FIG. 3. The horizontal support rollers 11 for the upper run 21 of the belt are supported on the structure of the base frame 6, as are the side support rollers 14, the inclination of the axes 140 of which determine the shape of the trough, which can either be shallow or deep. Arranged one after the other in the direction of movement, according to the size of the trough and the weight of the reaction components, is a plurality of support rollers. The upwardly curved edges 26 of the belt run 21 lie on the support rollers 14, and at the same time the edges 25 are constrained by the upper limiting rollers 13, which are also supported on the base frame 6. These edges are pressed downwards so that the trough that has been formed must, of necessity, pass along the rollers 11, 14, 13, in the defined trough-like shape. The base level 25 of the belt can also be lowered by an appropriately lowered arrangement of the support rollers 11, so that the reaction components are prevented from flowing back. In such a configuration of the trough for the liquid reaction components, there is no sealing required either forwardly (in the direction of motion), or rearwardly. It is also possible to replace the upper limiting rollers 13 by guide rails installed on both sides and in which the upward curved edges 26 are then guided.

Figure 11:
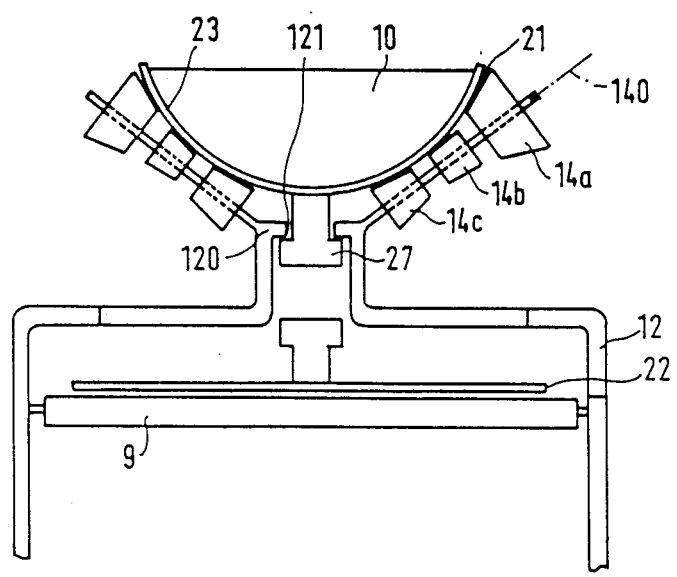
FIG. 11 is a schematic view along cross-section E of FIG. 10.

Another design solution for a belt system that prevents the backflow of the reaction components is shown in FIGS. 9 to 11. Here, the conveyor belt 2 is an endless belt which passes over the guide rollers 5, 7 with the side edges 26 being curved upwards from the peak plane 24 by means of the support rollers 14. At least one (and, in the version shown, two) pressure rollers 44, 45 are installed in the trough so formed before the supply and metering system 1 for the liquid reaction components. The surface configurations of the pressure rollers 44, 45 are matched to the shape of the trough as can be seen from FIG. 10 and thus the trough 23 is sealed off in the opposite direction to the direction of movement 3 of the conveyor belt. With such a design, the horizontal position of the conveyor belt will depend on the peak height of the guide rollers. The width of the pressure rollers 44, 45 corresponds to the width of the trough 23, in which connection the second rearmost roller serves as an additional seal against the backflow of the reaction components. The pressure rollers can be of an elastic material, e.g., synthetic rubber, and be used either alone or in combination with pressure rollers of a hard material, for example, stainless steel. The guiding and the support of the conveyor belt, particularly of the upper run 22, is provided by means of the guide rail 120. This guide rail 120 is connected to the base frame 6 through the frame 12, and, as can be seen from FIG. 11, has a continuous longitudinal slot 121. Projections 27 having a hammer-head profile are secured to the lower side of the conveyor belt and these engage with the guide rail 120 through the opening 121. These projections 27 can simultaneously engage with suitable grooves 71 in the guide rollers 7 (or in like manner in the guide roller 5) whereby they provide for a positive drive of the conveyor belt, when the guide roller 7 (or 5) is also configured as a drive roller.

As can be seen in FIG. 3 and 9, an irradiating system 43 and optional drying devices, such as infrared or ultraviolet lights which are used to initiate the polymerization process, can be arranged after the supply and metering system 1 for the reaction components. It is also possible, for use with specific processes, to seal off the whole of the belt system in an air-tight capsule, which then makes it possible to work in a specific gas atmosphere with the exclusion of atmospheric air, under pressure, or in a vacuum. In order to cool the conveyor belt or to provide for the input of energy, the belt system can also be provided with a cooling or a heating system, which is not shown in greater detail herein. The conveyor belt can be driven in the horizontal position, inclined slightly upwardly, or inclined slightly downwardly, which will all in turn depend on the speed of movement, the speed of the reaction, the polymerization, and the viscosity of the liquid reaction components.

It is preferred that cleaning devices, such as roller brushes 31, and drying rollers 42 be arranged on the underside of the returning run 22 of the belt. Support rollers 9 can be provided to support the lower run 22 of the belt.

Should the reaction components or the resulting polymer gel strand be inclined to adhere very strongly to the conveyor belt, it is also possible to treat said conveyor belt with a release agent after cleaning and before the application of the reaction components. The application of such a release agent by means of spray nozzles 18 is shown schematically in FIG. 9.

However, it is also possible to apply a release agent to the conveyor belt immediately after the guide roller 5, as is shown schematically in FIG. 5. When this is done, the release agent can be supplied from a container 17 through a control valve and out of the spray nozzle 18 onto a felt roller 16 or a brush by means of which it is then applied evenly to the upper run 21 of the conveyor belt. The felt roller 16 can also be secured in a suitable position on the base frame 6.

As can be seen from the cross-section of the upper belt run shown in FIG. 11, the trough shape 23 of the conveyor belt can be determined by the formation and configuration of the side support rollers 14 and the position of their axes 140. In the example shown, three variously shaped support rollers 14a, 14b, and 14c are arranged on the shaft 140, the profile of their surfaces resulting in a concave trough shape. The individual support rollers are preferably of cone-shaped or cylindrical forms.

Figure 7:
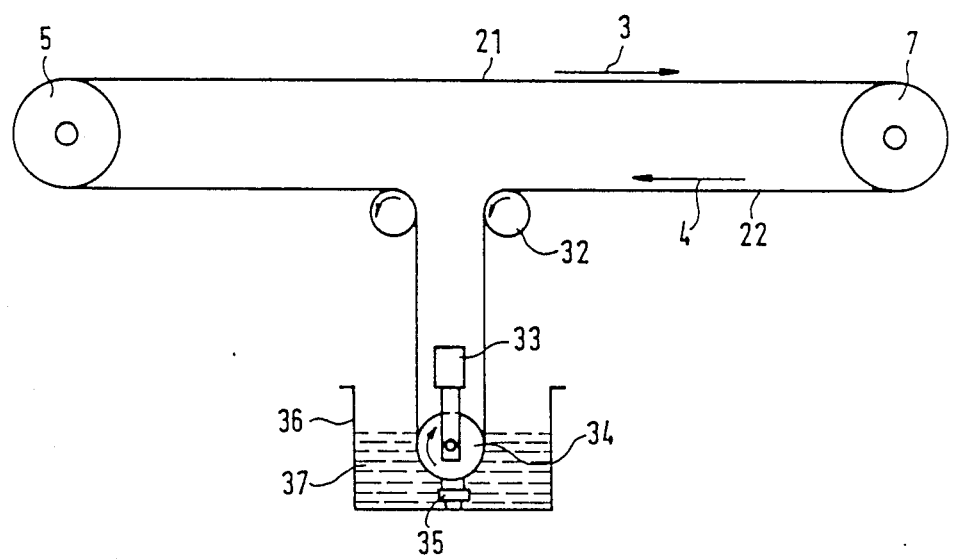

FIG. 6 and 7 show further possibilities for cleaning the belt system. As an example, according to FIG. 6, a rake 19 can be arranged on the return section of the conveyor belt in the region of the lower run 22 after the point at which the belt passes around the guide roller 7, followed by solvent spray nozzles 30 for loosening the polymer residue and then followed by a cleaning brush 3. It can also be arranged to have the brush dip into a container 31a therebeneath, said container having a suitable solvent passing through it so that the brush (saturated with solvent) can be used to cleanse the belt. However, it is also possible to have the lower run 22 of the belt, as is shown in FIG. 7, pass through a suitable solvent bath, such as container 36 with solvent 37, in which connection an idler pulley 34 (loaded with a weight 33) and a brush 35 are arranged within the bath.

Figure 8:
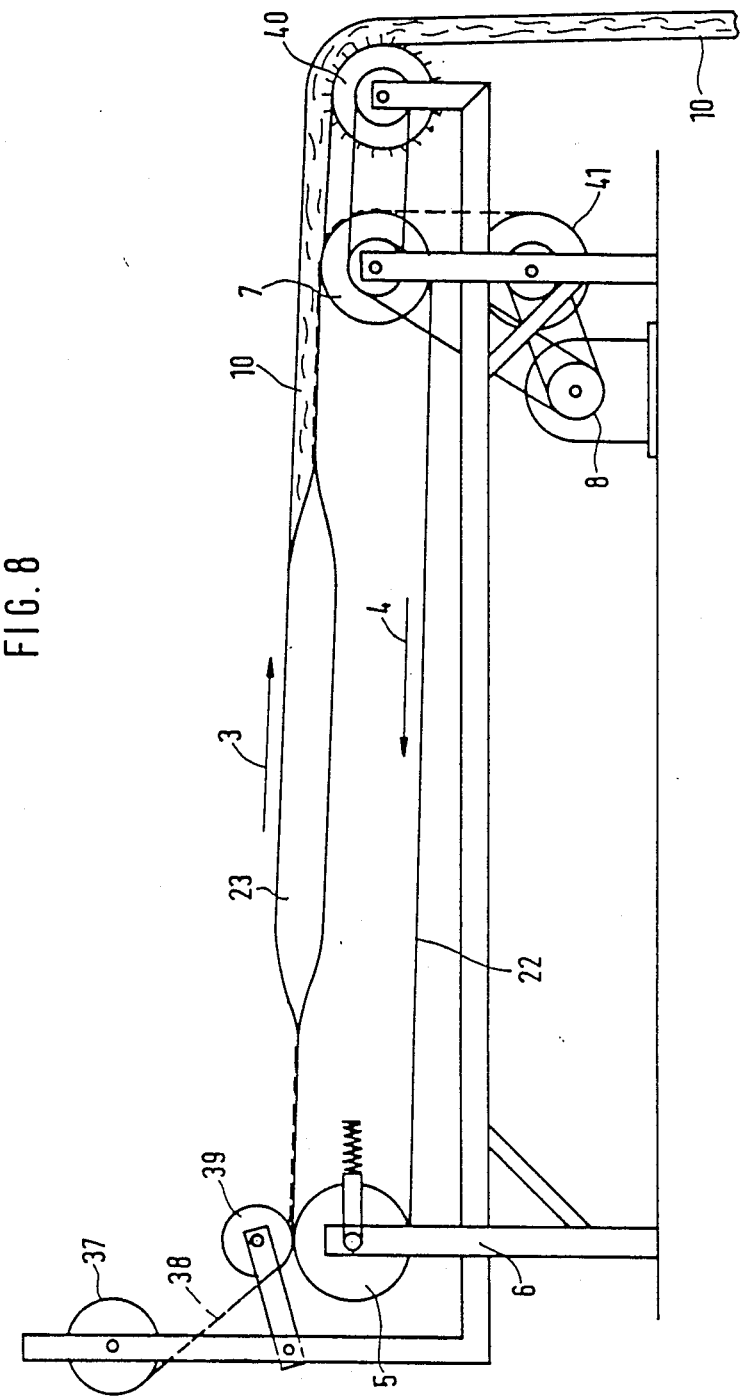
FIG. 8 is a schematic view of a belt system used in the process of the invention, having release sheet feeding and gel strand removal systems.

FIG. 8 is a schematic representation of a belt system with a release sheet 38, which can comprise a synthetic material, an impregnated textile fabric, a cellulose-based sheet, an impregnated paper or a low absorption paper and which accompanies the upper run 21 of the belt. The dispensing system is also secured to the base frame 6 and consists of release sheet supply roller 37 and apressure roller 39 which acts on the guide roller 5. The pressure roller 39 can also be used as a release agent roller. The release sheet 38 is removed once again at the end of the polymerization process on the guide roller 7—i.e., it is separated both from the polymer gel strand 10 and from the moving conveyor belt and is wound onto the pickup roller 41. When this is done, the drive is synchronized with the drive 8 for the guide roller 7. It is also possible to locate the dispensing system for the release sheet 38 above the upper run of the belt 21 in order to avoid any backflow of the reaction components contained in the trough formed by the conveyor belt and the release sheet.

In order to avoid any possible tearing of the polymer gel strand 10 (which is still soft) after its release from the conveyor belt or from the release sheet, a spiked or toothed roller 40 is arranged after the guide roller 7 as is shown in FIG. 8, this being used as both a brake and a motive element. It is also possible to provide a plurality of such spiked or toothed rollers or a pair of pressure rollers. These will run synchronously with the guide rollers and are coupled to the latter, for example, by means of pinions or a chain drive. The polymer gel strand 10 is pressed onto the tips of the roller 40 or through the gap between the pair of pressure rollers (where used) and in this way is prevented from tearing and is moved continuously forward.

The system according to the present invention is not confined to the embodiments shown herein.

The process for the polymerization of acrylic polymers from a monomer solution using a conveyor belt system of the type described above is explained in greater detail below by way of example.

EXAMPLE 1

69.0 kg acrylamide and 7.8 kg of acrylic acid were dissolved in 100 kg of water in a vessel that had previously been blown through with nitrogen and then adjusted to pH=9.5 with 13.5 kg of 45% potassium hydroxide solution. 1.5 kg of a mixture of 0.6 kg tetraallyloxyethane with 0.6 kg of polyoxyethylene-sorbitane in water were added to the monomer solution and blown through the nitrogen. Once the catalytic solution had been mixed in a mixing apparatus, the monomer solution was applied at a metered speed of 1.5 kg/min to the conveyor belt of a belt system according to FIG. 3. The catalyst system consisted of a redox system with 0.3 kg of sodium pyrosulfite, 0.16 kg of potassium persulfate and 0.01 kg of iron-II-gluconate and 0.16 kg of AIBN azoinitiator. The speed of travel of the conveyor belt was 10 cm/min and the total reaction time amounted to 30 minutes, with the maximum temperature of 101° C. achieved after 15 minutes. The yield amounted to 99.1%. A polyethylene foil, 0.075 mm thick, was used as a release sheet between the polyamide conveyor belt and the polymer gel. When extended, the conveyor belt was 60 cm wide and formed a trough 30 cm wide and 15 cm deep. The polymer gel strand was 6 cm thick.

EXAMPLE 2

186 kg of acrylic acid and 370 kg of water were placed in an enamelled container and neutralized to pH=4.3 with 91 kg of sodium hydrogen carbonate. The monomer solution was blow through with nitrogen and, after the catalytic solutions had been mixed in a mixing tube, was dosed at a metered speed of 2 kg/min onto the conveyor belt. The catalytic system consisted of a mixture of 5.4 kg of ABAH azoinitiator and a photoinitiator (0.5 kg of benzyldimethylketal). Polymerization was initiated by ultraviolet light. with the conveyor belt running at a speed of 12.5 cm/min the mxiumu temperature of 100° C. was achieved after 10 minutes. After a stretch of approximately 100 cm, the monomer solution was no longer liquid and formed a gel-like mass. The total reaction time amounted to 25 minutes, and a yield of 98% was achieved, i.e., the residual monomer content amounted to 2%-wt. A belt system as in Example 1 was used, and the reaction components were applied in a layer 7 cm thick.

EXAMPLE 3

0.4% polyethylene oxide was added to a monomer solution as in Example 1 and this increased the viscosity of the monomer solution from 10 mPa.s to 150 mPa.s and reduced the fluidity of the monomer solution. Polymerization was completed under the same conditions as set out in Example 2. The maximum temperature was achieved after 10 minutes of exposure to radiation and after a stretch of approximately 80 cm the monomer solution was no longer mobile and had formed a gel-like mass.

EXAMPLE 4

42.0 kg of acrylic acid and 4.2 kg of methacrylic acid were mixed with 125 kg of water in a vessel that had been blown through with nitrogen and then neutralized to pH=4.4 with 18.5 kg of 25-% ammonia whilst being cooled. 0.2 kg of methylene bisacrylamide was then added to the monomer solution and blown through with nitrogen. The monomer and catalyst solutions were applied to a conveyor belt of silicon rubber at a metered speed of 50 kg/hour (monomer solution) and 5 kg/hour (catalyst solution) using transfer pumps, for which a belt system aaccording to FIGS. 1 and 3 was used. The catalytic system consisted of a mixture of 80 g of azobispropionic acid amidine hydrochloride and 40 g of benzyl dimethylketal dissolved in dilute acrylic acid. The speed of the conveyor belt amounted to 5 cm/min and the total reaction time was 24 minutes, with the maximum temperature of 102° C. being reached after 11 minutes. The reaction components were applied to a coating thickness of 8 cm and the solution had a viscosity of 14 mPa.s. A yield of 99.5% was achieved.

EXAMPLE 5

In an enamel vessel, 1.1 kg methylene bisacrylamide were dissolved in 156 kg acrylic acid and 390 kg water. The pH of the unneutralized monomer solution was 2.05. The monomer solution was blown through with nitrogen and after mixing with the catalyst solution in a mixing tube, was applied to a conveyor belt at a metered speed of 1.8 kg/min. The catalyst system consisted of a solution of 0.12 kg ABAH/0.2 kg t-butyl hydroperoxide in water and a photoinitiator (0.06 kg benzyl dimethyl ketal). The polymerization was initiated by UV-light. With a conveyor belt speed of 12.5 cm/min, the maximum temperature of 90° C. was reached after 10 minutes. The complete reaction time was 30 minutes, whereupon a yield of 98% was realized. The conveyor had a belt surface faced with silicon rubber and the reaction components were applied to form a layer thickness of 6 cm.

EXAMPLE 6

In a boiler which had been blown through with nitrogen, 137 kg acrylic acid and 19.1 kg dimethylaminopropylacrylamide were dissolved in 300 kg water and neutralized with 71 kg of 45% caustic soda. The monomer solution which had been blown through with nitrogen was, after mixing with catalyst solution, applied to a belt conveyor according to FIG. 1 at a metered rate of 1.5 kg/min. The catalyst system consisted of a redox system according to Example 1 (sodium pyrosulfite, potassium persulfate, iron-II-gluconate) and ABAH. The conveyor speed was 10 cm/min and the complete reaction time was 30 mins. The yield was 98.5%. As the release medium between the polyamide conveyor belt and the polymer gel, a polyethylene sheet was used. The polymer gel strand had a thickness of 6 cm.

EXAMPLE 7

1.12 kg methylene bisacrylamide were dissolved in the partially neutralized monomer solution according to Example 6 and polymerized on the belt under UV radiation. The catalyst system consisted of a solution of 0.06 kg benzyldimethylketal, 0.12 kg ABAH and 0.18 kg t-butyl hydroperoxide. The monomer solution was next mixed with the catalyst solutions and then applied to the conveyor belt travelling at a speed of 10 cm/min, with a metered rate of 1.8 kg/min. As the separation layer between the conveyor belt and the polymer gel, an accompanying cellulose sheet was used, which stayed with the polymer gel. The polymer gel had a thickness of 8 cm. and the yield was 99.1%.

EXAMPLE 8

1.5 kg. methylene bisacrylamide were dissolve in the partially neutralized monomer solution according to Example 2, after which the solution was blown through with nitrogen and applied to the conveyor belt at a metered rate of 10 cm/min. The polymerization was initiated with UV-radiation (catalyst system: benzyldimethylketal, ABAH and t-butyl hydroperoxide). The polymer strand had a thickness of 11 cm. and the yield was 99.5%.

EXAMPLE 9

A monomer solution of 140 kg acrylic acid, 16.1 kg hydroxypropyl acrylate and 1.12 kg methylene bisacrylamide in 280 kg water, partially neutralized with 88 kg 45% caustic soda, was applied at a rate of 1.0 kg/min. to a conveyor belt travelling at 10 cm/min and the polymerization initiated with UV-radiation (catalyst system according to Example 7). The layer thickness of the monomer solution was 6 cm. and a yield of 98.1% was achieved.

EXAMPLE 10

A monomer solution of 145 kg acrylic acid, 11.0 kg vinyl acetate and 1.12 kg methylene bisacrylamide in 280 kg water, partially neutralized with 91 kg 45% caustic soda, was applied at a rate of 1.1 kg/min. to a conveyor belt travelling at 10 cm/min and the polymerization initiated with UV-radiation (catalyst system according to Example 7). The layer thickness of the monomer solution was 5 cm. and a yield of 99.0% was achieved.

EXAMPLE 11

A monomer solution of 125 kg acrylic acid, 90 kg acrylamidopropanesulfonic acid and 1.12 kg methylene bisacrylamide in 280 kg water, partially neutralized with 135 kg 45% caustic soda, was applied at a rate of 0.8 kg/min. to a conveyor belt travelling at 10 cm/min and the polymerization initiated with UV-radiation (catalyst system according to Example 7). The layer thickness of the monomer solution was 4 cm. and a yield of 98.7% was achieved.

EXAMPLE 12

18.6 kg of acrylic acid and 0.11 kg of acrylamide dissolved in 39.5 kg water in an enamelled container. The monomer solution pH was 4.5. The monomer solution was blown through with nitrogen and, after the catalyst solutions had been mixed in a mixing tube, was dosed at a metered speed of 0.17 kg/min onto the conveyor belt. The catalyst system consisted of a solution of 12 g of ABAH and 20 g t-butyl hydroperoxide in water and a photoinitiator (6.5 g benyldimethylketal). Polymerization was initiated by ultraviolet light. With the conveyor belt running at a speed of 6 cm/min the maximum temperature of 102° C. was achieved after 10 minutes. The total reaction time amounted to 18 minutes, and a yield of 99.8% was achieved. A belt construction in accordance with the invention was used, the belt having a surface coating of silicon rubber. The conveyor belt had in its extended condition a width of 16 cm. and formed a trough 10 cm. wide and 5.5 cm. deep. The polymer gel strand had a thickness of 4 cm.

EXAMPLE 13

In a container which had been blown through with nitrogen, 7.8 kg acrylamide and 21.3 kg dimethylaminoethyl acrylate, quaternized with $CH_3Cl$, were dissolved in 31.0 kg water. The monomer solution which had been blown through with nitrogen, after mixing with catalyst solution, was applied to a belt conveyor having a construction according to Example 12 with a metered rate of 0.17 kg/min. the catalyst system consisted of a redox system comprising 0.39 sodium pyrosulfite and 0.69 potassium persulfate, and 12.0 g ABAH. The conveyor speed was 4.5 cm/min and the complete reaction time was 30 mins. The yield was 98.5%. As the release medium between the polyamide conveyor belt and the polymer gel, a polyethylene sheet was used. The polymer gel strand had a thickness of 5 cm.

EXAMPLE 14

A monomer solution of 12.5 kg acrylamide, 9.0 kg acrylamidopropane sulfonic acid and 0.11 kg methylene bisacrylamide in 38.0 kg water, partially neutralized with 2.6 kg 45% caustic soda, was applied at a rate of 0.1 kg/min. to a conveyor belt travelling at 6 cm/min. With a catalyst system according to Example 12, the monomer solution was polymerized under UV-radiation. The layer thickness of the monomer solution was 3 cm. and a yield of 98.1% was achieved.

What is claimed is:

1. In a process for the continuous production of polymers and copolymers of water-soluble monomers, by polymerization of an aqueous monomer solution containing 2.2–8.3 moles of polymerizable double bonds per kilo of monomer solution at a temperature in the range from about −10 to 120° C., the liquid reaction components being applied in a layer at least one centimeter thick on a moving endless conveyor belt and polymerized, the improvement which comprises adding the liquid reaction components to a trough formed by the moving conveyor belt, the trough shape of the conveyor belt being continuously changed to an extended and flat profile during the polymerization of the reaction components, and the resulting polymer gel strand being continuously released from the side edges towards the center of the trough formed by the conveyor belt, as the curved trough shape of the conveyor belt changes to the extended, flat profile, the release of the polymer gel strand from the surface of the conveyor belt, as a result of the changing shape of the trough formed by the conveyor belt during the course of polymerization, proceeding under the condition $P > A.F.$ wherein P is the force with which the conveyor belt is converted from the trough shape to the extended, flat profile; A. is the contact area between the gel strand and the conveyor belt; and F. is the force of adhesion of the gel strand to the conveyor belt.

2. A process according to claim 1, wherein the monomer solution is continuously metered into the trough formed by the conveyor belt to a coating thickness of at least 2 cm, and the polymer gel strand that is formed assumes the shape of the trough during the polymerization process.

3. A process according to claim 1, wherein the polymerization is completed within 60 minutes.

4. A process according to claim 1, wherein the pH of the monomer solution is below 10.

5. A process according to claim 1, wherein the aqueous monomer solution additionally contains at least one of a catalyst and photoinitiator.

6. A process according to claim 1, wherein the conveyor belt is at least partly flexible and matches the desired trough shape during the polymerization process.

7. A process according to claim 1, wherein the liquid reaction components are applied to a release sheet that is positioned on and advances with the conveyor belt, said sheet comprising a synthetic material, an impregnated textile fabric, a cellulosic sheet, an impregnated paper, or a low absorption paper.

8. A process according to claim 7, wherein the release sheet is based on cellulose or synthetic material, and the sheet and polymer gel strand produced thereon are together subjected to further processing, said sheet becoming a component of the polymer that is produced.

9. A process according to claim 1, wherein at least the uppermost layer of the conveyor belt that comes into contact with the reaction components consists of silicon rubber to which the reaction components are directly applied.

10. A process according to claim 1, wherein in order to form the trough shape, the side edges of the conveyor belt are curved upwardly from the horizontal plane forward to the area in which the reaction components are introduced.

11. A process according to claim 1, wherein the level of the conveyor belt in the area in which the trough is formed is lowered relative to the preceding level of the approaching flat conveyor belt.

12. A process according to claim 1, wherein the trough formed by the conveyor belt is sealed off forwardly of the area in which the reaction components are dispensed, with respect to the direction of movement of the conveyor belt.

13. A process according to claim 1, wherein natural or synthetic thickening agents are added to the monomer solution.

14. A process according to claim 1, wherein a monomer solution with a viscosity in the range of 5-5000 mPa.s is used.

15. A process according to claim 1, wherein polymerization of the monomer solution is initiated by means of ultraviolet radiation with the use of at least one photoinitiator or chemical catalyst.

16. A process according to claim 1, wherein said monomers are selected from acrylic acid and methacrylic acid.

17. A process according to claim 1, wherein the monomers are selected from acrylamide, methacrylonitrile, acrylonitrile, vinyl pyridine, vinyl acetate, polymerizable acids other than acrylic acid or methacrylic acid, salts of polymerizable acids other than acrylic acid or methacrylic acid, amino group-containing and ammonium group-containing esters and amides of polymerizable acids other than acrylic acid or methacrylic acid, alone or in admixture with one another or as comonomers together with acrylic acid and/or methacrylic acid.

18. A process according to claim 1, wherein for the polymerization of water-insoluble comonomers styrene and alkylated styrenes alone or in admixture in amounts up to 40 wt.-% based upon the total weight of the monomers are used.

19. A process according to claim 1, wherein up to 20 wt.-% based upon the total weight of the monomers are cross-linkable monomers with more than one polymerizable group.

* * * * *